April 15, 1924.

F. X. LAUTERBUR 1,490,392

MIXER

Filed May 3, 1923

INVENTOR:
Frank X. Lauterbur
BY
Allen & Allen

HIS ATTORNEYS.

April 15, 1924.
F. X. LAUTERBUR
MIXER
Filed May 3, 1923
1,490,392
3 Sheets-Sheet 2
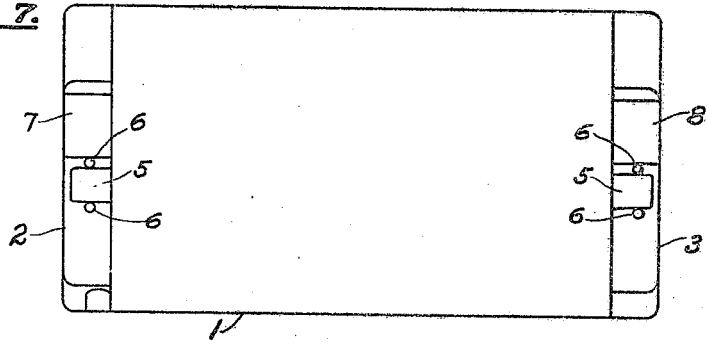
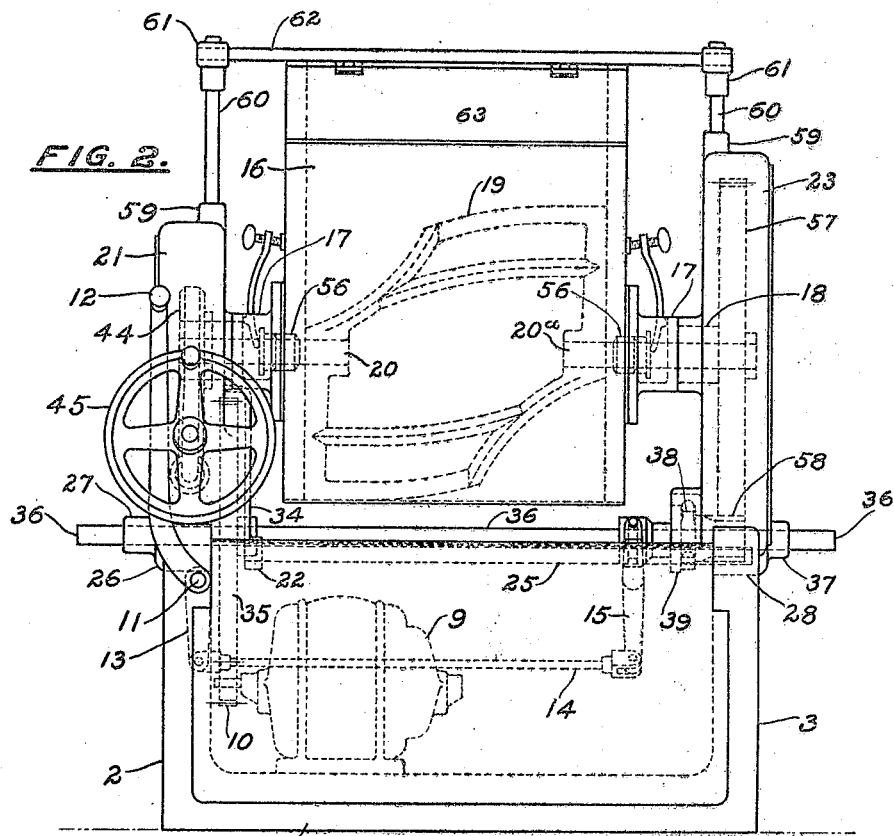
INVENTOR:
Frank X. Lauterbur
BY
Allen + Allen
HIS ATTORNEYS.

April 15, 1924.

F. X. LAUTERBUR 1,490,392

MIXER

Filed May 3, 1923

INVENTOR:

Frank X. Lauterbur

BY

Allen & Allen

HIS ATTORNEYS.

Patented Apr. 15, 1924.

1,490,392

UNITED STATES PATENT OFFICE.

FRANK X. LAUTERBUR, OF SIDNEY, OHIO.

MIXER.

Application filed May 3, 1923. Serial No. 636,354.

*To all whom it may concern:*

Be it known that I, FRANK X. LAUTERBUR, a citizen of the United States, and a resident of Sidney, in the county of Shelby and State of Ohio, have invented certain new and useful Improvements in Mixers, of which the following is a full, clear, and exact description, reference being had to the accompanying drawings, forming part of this specification.

My invention relates to devices used in various arts, and employed for mixing plastic substances, and in particular to such devices as are used in the bakery for mixing dough.

The provision of a structure with a large heavy bowl which can be tilted, and in which a motor driven shaft revolves, requires according to present practice, expensive labor operations in aligning bearings, and truing up the mechanical parts. It also requires the use of shaft housings, and various casing members for gears and the like, most of which requires close machine work, and must be carefully and accurately placed. Furthermore, mixers, built according to present practice when once taken down, as for repairs, or transportation from one place to another in a building, are difficult to re-assemble and true up, and require the use of skilled labor which must be obtained from the outside in the usual bakery, for example.

It is my object in this invention, to provide for a frame-work structure, in mixers, which does away to a large extent with assembly difficulty, provides fixed centers for shaft bearings, and fixed spacing of mechanical parts. It is my further object to so arrange the frame parts that where the gear housings and shaft bearings are concerned, the frame is separable and readily manipulated, so as to make it possible to machine surfaces thereon, which would not be practical where a large unitary frame is concerned.

It is my object more specifically to provide in connection with the standards of the machine for separable housings, adapted to fit in a specific place on the standards, and in these housings to carry practically all of the moving parts which require particular placing and alignment. These housings I employ also to suspend or mount the bowls and blades of the mixing machine, and the standards are so arranged that the housings, together with parts mounted thereby can be quickly detached therefrom, and the machine thus made into two parts which can be separately assembled, and separately transported and set together again without any work requiring close readjustments.

I accomplish my objects by that certain construction and arrangement of parts, of which I will now describe a complete example, selected for purposes of illustration, and the inherent novelty whereof I will set forth in the appended claims.

In the drawings:

Figure 2 is a front elevation thereof.

Figure 7 is a top plan view of the machine base and side standards.

Figure 8:
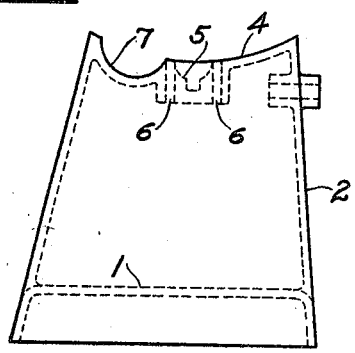
Figure 8 is an end elevation of the part shown in Figure 7 taken at the bowl controlling end.
Figure 9:
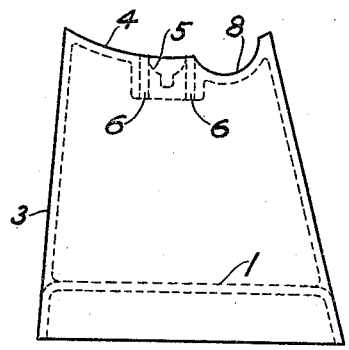
Figure 9 is a detail end elevation showing the standard construction at the mixer blade shaft controlling end of the machine.
Figure 1:
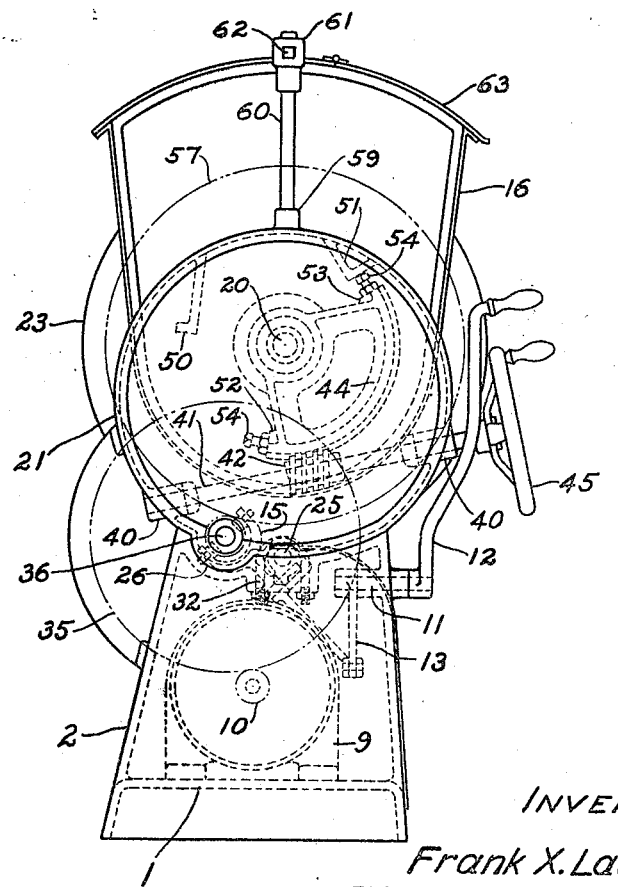
Figure 1 is an end elevation of the complete machine.
Figure 3:
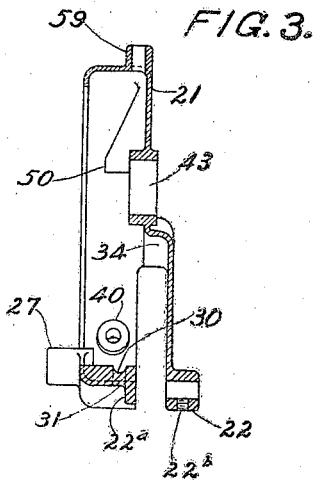
Figure 3 is a central vertical section taken through the frame-work piece employed as a support, and as a housing for the bowl operating mechanism.
Figure 4:
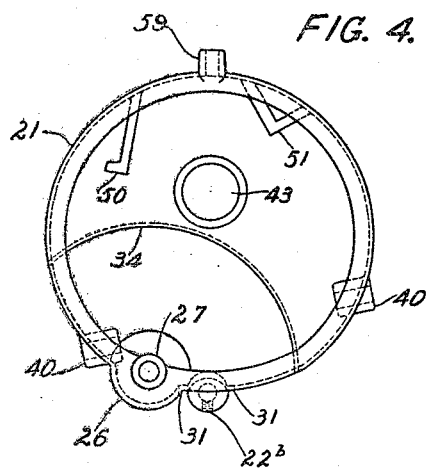
Figure 4 is an elevation of the inner face of the part shown in Figure 3.
Figure 6:
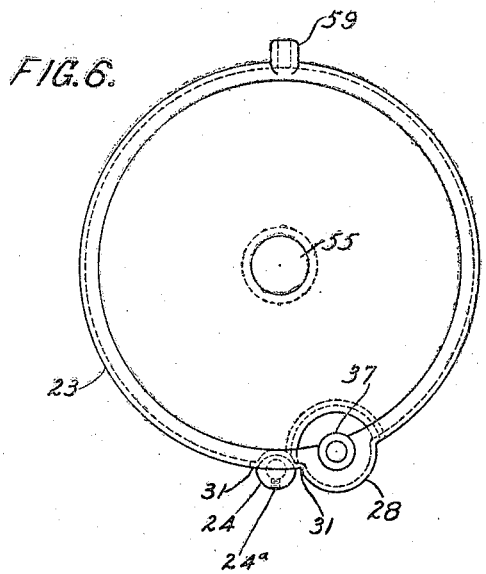
Figure 6 is an elevation of the inner face of the part shown in Figure 5.
Figure 5:
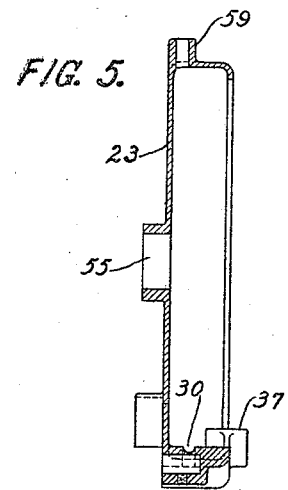
Figure 5 is a central vertical section taken through the frame-work piece employed as a support and as a housing for the mixer blade shaft of the device.

Referring first to the standards and base of the machine, I have shown an integral casting, having the base 1, and side standards 2 and 3, which are short comparatively to the usual side standards of machines of the character shown, and which in the completed machine will be below the level of the operating shafts and the bowl. It will be noted that the top edges of the two standards are formed with particular relation to the parts which are to be mounted thereon. Thus each standard in the example shown has an arcuate top edge 4, having a cylindrical socket 5, therein, and a pair of holes 6, 6, along-side of the socket. To the right of the socket 5 in the bowl manipulating end of the machine is a larger cylindrical depression, formed in top edge of the standard as at 7, while on the other end of the machine, this depression as at 8 is at the other side (left) of the central depression or socket 5.

On the base is set the motor 9, in motor driven machines, which drives a gear 10 on its rotor shaft. Also for convenience a clutch operating mechanism is mounted in the one standard in the form of a stub shaft 11 carrying a handle 12, with an arm on the shaft 11 as at 13, connected by a connecting rod 14, with the fork arm 15 for a clutch. This fork arm is carried, as is the remaining mechanism on the separable parts of the standards.

The mixing bowl 16 has trunnions 17, which are machined as at 18 where they extend into the mounting bearings. The mixing blade 19 is mounted on and mechanically forms a part of laterally extended shafts 20, 20$^a$, which for convenience I have termed the mixing shaft.

The bowl and mixing blade device are the same as in the usual mixer, and are operated in the same manner as is customary; my invention relating as has been said to the frame parts, journals and the like.

The two separable standard portions are generally similar, except for such variations as are required to effect the usual driving operations for the machine.

Referring first to the bowl control side of the machine, I have shown the housing having a cylindrical body 21, having a boss 22, at its lower end (when mounted), and an ear 22$^a$ of the same contour as the boss and spaced therefrom. The other housing or standard part has a cylindrical body 23, with a boss 24 at its lower end. The ear 22$^a$ and the boss 24 are adapted to seat in the sockets 5, in the two main standards, and set into the two bosses, in assembling the machine, is a rod or bar, 25, which thus connects the two housings, and holds them in spaced relation. This bar is held in one or both of the bosses by means of set screws set in the tapped holes 22$^b$ and 24$^a$.

The housing 21 has a cylindrical projection 26 thereon surrounding a boss 27, and the housing 23 has a cylindrical projection 28 like the projection 26. The projections 26 and 28 seat in the two depressions 7 and 8 of the standards, thereby providing for each housing a pair of cylindrical seats in the side standards which positively locates each housing with reference to the base of the machine and with reference to each other.

Formed in the housing 21, in the lower inner periphery thereof is a groove 30, which terminates in two holes 31, 31, which are positioned at the two sides of the projection 22$^a$. The housing 23 has formed in the boss 24 thereof, a groove like to the groove 30.

It will be recalled that there were holes 6, 6, alongside of the central depressions in the top edges of the side standards in the projections cast with the same, and I provide U-bolts or yokes 32, which seat in the two grooves above mentioned and whose ends pass down through the holes 6, 6, and receive nuts on their lower ends, which thereby clamp the two housings down on the standards, and complete the alignment thereof in every respect with the said standards. This mounting means also permits of a ready detachment of the upper housing or standard sections.

The housing 21 is formed with an inner wall which is bulged as at 34, to give clearance to a large gear 35 mounted on a shaft 36. The shaft 36 is mounted in the boss 27 in the housing 21, and the boss 37 in the housing 23, and extends across between the two housings. The large gear 35 is so arranged that it will mesh with the motor shaft gear when the housing 21 is bolted down in place, as described.

A sleeve 38 is set over the shaft 36 in the housing 23, and a clutch of any desired type as indicated at 39, is used to drive this sleeve from the shaft 36, at will. The clutch fork has already been mentioned and it will be noted that the shaft which supports this fork is or may be mounted on the connecting bar between the two housings, and is so shown in this instance.

In the housing 21 are a pair of bosses 40, in which is set a shaft 41 carrying a worm 42, said worm thus lying within the housing. The bowl trunnion hitherto noted passes into the housing 21 through a machined bearing 43, which is cast integral with the housing and within the housing is fitted with a fast sector gear 44. The worm drives this sector gear and thus rocks the bowl, a hand wheel 45 being shown, as used for manipulation of the shaft 41.

I wish particularly to note the fact that the journal for the bowl trunnions in each housing is formed as part of the housing, and is thus not formed of separable parts, as is the usual housing in devices of this character. Because of the size of the housings, the machining of the journal can be accomplished according to usual shop practice.

I have shown a convenient form of stop for the bowl sector, in the housing 21, which takes the place of cumbersome and more or less costly mechanisms now in general use in mixers for the same purpose.

Thus I form two webs 50 and 51 on the inside of the housing 21, one of which acts as a stop to guide the operator or builder in getting his bowl to a true vertical position, and the other of which prevents tipping the bowl beyond the correct angle to dump the contents. The sector gear is formed with two bosses 52 and 53, in which are set bolts or screw posts 54, same being used as abutments to contact with the two webs noted.

Lock nuts on the bolts will hold them in position after adjustment to correct stopping position.

In the housing 23, there is formed an integral machined bearing 55, like the bearing 43, and the bowl trunnion seats in this bearing. The trunnions are both fitted with a packing mechanism of desired type, as indicated at 56, and the mixer blade shaft passes through the trunnions through the packed joints thereby protecting the contents of the bowl. The mixer blade shaft extends clear through the trunnion with the housing 23, and is there fitted with a large gear 57. This gear is driven by a smaller gear 58 on the sleeve 38.

I have shown bosses 59 on the tops of the two housings, in which are set posts 60. These posts support by means of suitable fittings 61, a cross rod 62, that lies above the mixing bowl, and supports the lid 63 of the said bowl. These posts and the lid device are not a departure from standard practice, except that they are mounted direct on the separable standard members or housings.

It will be noted that the mixer blade is driven from the motor to the shaft 36, through the controlled clutch, to the sleeve and its gear, and thence through the large gear 57.

The bowl and its trunnions, and the mixer blade and its shaft, and the gearing itself, are not essentially different from present practice, and no changes need to be made in the machine other than in the frame parts noted.

To build up the machine, the standards are suitably prepared as noted, and the housings are then prepared and machined. The bowl and the blade are assembled, and the trunnions of the bowl set into the journals in the two housings. The shafts and connecting rods are then set in place, and the gears placed and pinned or keyed.

Thus the machine is built in two units, as it were, and in completing the assembly, the bowl, and housing portions are set on the standards, and the U-bolts or yokes bolted in place. The machine will then be ready to operate.

By following this construction the housings for the gears may be made of desired thickness and strength without regard to the composition and structure of the side standards, and economy in material may thus be accomplished. The economy in setting up the machine, as will be obvious, is very great, and the ease of taking it apart for moving it from one place to another is likewise easy, and "fool-proof". The saving of parts, and in aligning work as to the trunnion journals, in the plant of the manufacturer, is great, and the greater ease of manipulation and transportation of the parts in effecting the assembly is likewise obvious.

I do not wish to be limited by the specific arrangements shown to accomplish my objects, and have described the novel features of my invention with relation to a single set of devices only for purposes of clearness.

Having thus described my invention, what I claim as new and desire to secure by Letters Patent, is:—

1. In a mixer, the combination of a base and side standards rigidly related thereto and extending upwardly therefrom, a mixer bowl and mixing blade, of frame parts separably mounted on the side standards, and arranged to support the mixing bowl and blade.

2. In a mixer, the combination of a base and side standards rigidly related thereto and extending upwardly therefrom, a mixer bowl and mixing blade, of frame parts separably mounted on the side standards, and arranged to support the mixing bowl and blade, a driving mechanism mounted on the base, and gearing intermediate the bowl and blade and said driving mechanism, adapted to come into mesh upon mounting of the separable frame parts.

3. In a mixer, the combination of a base and side standards rigidly related thereto and extending upwardly therefrom, a mixer bowl and mixing blade, of frame parts separably mounted on the side standards, and arranged to support the mixing bowl and blade, and interconnecting means between the separable frame parts adapted to hold them together independently of the base and standards.

4. In a mixer, the combination of a base and side standards rigidly related thereto and extending upwardly therefrom, a mixer bowl and mixing blade, of frame parts separably mounted on the side standards, and arranged to support the mixing bowl and blade, said separable frame parts having journals for the bowl formed integrally therein.

5. In a mixer, the combination of a base and side standards rigidly related thereto and extending upwardly therefrom, a mixer bowl and mixing blade, of frame parts separably mounted on the side standards, and arranged to support the mixing bowl and blade, gears and shafting to rock the bowl and revolve the mixing blade, said gears and shafting mounted in the said separable frame parts.

6. In a mixer, the combination of a base and side standards rigidly related thereto and extending upwardly therefrom, a mixer bowl and mixing blade, of frame parts separably mounted on the side standards, and arranged to support the mixing bowl and blade, gears and shafting to rock the bowl and revolve the mixing blade, said gears and shafting mounted in the said separable frame parts, and journals for the bowl, and said shafts formed integrally in the said separable frame parts.

7. In a machine of the character described, a base and side standards, a mixing bowl, and blade, separable frame parts mounted on the side standards and arranged to support the bowl and blade, and matching projections and depressions on the separable frame parts, adapted to fix definitely the relative positions thereof when assembled.

8. In a machine of the character described, a base and side standards, a mixing bowl and blade, separable frame parts mounted on the side standards and arranged to support the bowl and blade, and means for detachably securing the said frame parts to the side standards, comprising U-bolts, seated in the frame parts and passing through holes in the side standards, for the purpose described.

9. In a machine of the character described, the combination of a base and side standards, of a mixing bowl having trunnions, a blade within the bowl having shafts extending through said trunnions, separable frame parts having journals for the bowl trunnions formed therein, a driving mechanism to operate the bowl in one of the frame parts, a driving mechanism to operate the mixing blade in the other mechanism, a power means interconnecting mechanism between the same and the mechanism carried by one of said frame parts, shafting extending from said frame part to the other frame part to transfer said power thereto, and interconnecting means between the two frame parts, whereby the bowl, blade and frame parts may be assembled together, and as a unit set on the side standards.

FRANK X. LAUTERBUR.